United States Patent
Dong et al.

(10) Patent No.: US 10,457,524 B2
(45) Date of Patent: Oct. 29, 2019

(54) TENSION DEVICE FOR DRIVE CHAIN, METHOD AND ESCALATOR SYSTEM USING SAME

(71) Applicants: KONE CORPORATION, Helsinki (FI); KONE Elevator Co., Ltd., Yushan Town Kunshan, Jiangsu (CN)

(72) Inventors: Yajun Dong, Yushan Town Kunshan (CN); Andreas Mnich, Hattingen (DE)

(73) Assignees: KONE CORPORATION, Helsinki (FI); KONE ELEVATOR CO., LTD., Yushan Town Kunshan, Jiangsu (CN)

( * ) Notice: Subject to any disclaimer, the term of this patent is extended or adjusted under 35 U.S.C. 154(b) by 0 days.

(21) Appl. No.: 16/119,015

(22) Filed: Aug. 31, 2018

(65) Prior Publication Data

US 2019/0071286 A1  Mar. 7, 2019

(30) Foreign Application Priority Data

Sep. 1, 2017 (CN) .......................... 2017 1 0779739

(51) Int. Cl.
*B66B 23/04* (2006.01)
*B66B 23/20* (2006.01)
(Continued)

(52) U.S. Cl.
CPC .............. *B66B 23/04* (2013.01); *B66B 23/20* (2013.01); *F16H 7/06* (2013.01); *F16H 7/08* (2013.01);
(Continued)

(58) Field of Classification Search
CPC ........ B65G 23/44; B65G 23/16; B65G 23/20; B65G 23/04; F16H 7/08; F16H 2007/0872
(Continued)

(56) References Cited

U.S. PATENT DOCUMENTS 1,304,362 A * 5/1919 Panoulias ............ A23G 3/2076
                                                        118/24
2,669,339 A   2/1954 Hansen
(Continued)

FOREIGN PATENT DOCUMENTS

CN        2859091 Y    1/2007
CN      102027265 A    4/2011
(Continued)

OTHER PUBLICATIONS

Extended European Search Report for European Application No. 18192058.8, dated Mar. 1, 2019.

*Primary Examiner* — James R Bidwell
(74) *Attorney, Agent, or Firm* — Birch, Stewart, Kolasch & Birch, LLP

(57) ABSTRACT

The present disclosure discloses a tension device for a drive chain of a handrail system of an escalator system, a method and an escalator system including the same. The tension device for the drive chain applies pressures in opposite directions to a drive chain so as to make portions of the drive close to each other to tension the drive chain. The pressures are applied to the drive chain via a weight or a pre-loaded spring. The present disclosure also provides a method for tensioning a drive chain. The present disclosure can eliminate loosening of the drive chain after running several months, eliminate periodic heavy work on site for the escalator system and a drive system comprising the drive chain, and improve quality thereof in a simple, reliable and low cost manner.

20 Claims, 6 Drawing Sheets

(51) Int. Cl.
  *F16H 7/08* (2006.01)
  *F16H 7/06* (2006.01)
  *F16H 7/18* (2006.01)

(52) U.S. Cl.
  CPC ....... *F16H 7/18* (2013.01); *F16H 2007/0806* (2013.01); *F16H 2007/0821* (2013.01); *F16H 2007/0842* (2013.01); *F16H 2007/0872* (2013.01); *F16H 2007/0874* (2013.01); *F16H 2007/0893* (2013.01); *F16H 2007/0897* (2013.01)

(58) Field of Classification Search
  USPC ................................ 198/329, 336, 814, 815
  See application file for complete search history.

(56) References Cited

U.S. PATENT DOCUMENTS

| | | | | |
|---|---|---|---|---|
| 3,749,224 A | * | 7/1973 | Engeler | B66B 23/04 198/331 |
| 3,811,332 A | | 5/1974 | Brown et al. | |
| 5,026,326 A | * | 6/1991 | Pollich | F16H 7/12 198/813 |
| 5,207,308 A | * | 5/1993 | Sheffield | B66B 23/20 198/336 |
| 6,460,679 B1 | * | 10/2002 | Stuffel | B66B 23/20 198/336 |
| 8,936,147 B2 | * | 1/2015 | Knas | B65G 23/44 198/814 |
| 2006/0276285 A1 | | 12/2006 | Markley et al. | |
| 2008/0029365 A1 | * | 2/2008 | Stuffel | B66B 23/20 198/336 |
| 2008/0164121 A1 | * | 7/2008 | Gonzalez Alemany | B66B 23/04 198/336 |
| 2009/0183968 A1 | * | 7/2009 | Gonzalez Alemany | B66B 23/04 198/336 |
| 2011/0077114 A1 | | 3/2011 | Markley | |

FOREIGN PATENT DOCUMENTS

| | | |
|---|---|---|
| CN | 202646563 U | 1/2013 |
| CN | 203781604 U | 8/2014 |
| CN | 206145076 U | 5/2017 |
| DE | 4427509 A1 | 2/1996 |
| DE | 102015211157 A1 | 12/2016 |
| JP | 2006-342964 A | 12/2006 |
| SU | 879105 A1 | 11/1981 |

* cited by examiner

TENSION DEVICE FOR DRIVE CHAIN, METHOD AND ESCALATOR SYSTEM USING SAME

TECHNICAL FIELD

The present disclosure relates to a tension device for a drive chain of a handrail system of an escalator system, method and an escalator system using the same.

BACKGROUND

An escalator system comprises a handrail system moving in correspondence with steps of the escalator. The handrail system comprises fixed balustrades and a handrail band with a moving path controlled by a handrail band rail fixed on the balustrades. The handrail band is guided and tensioned by a drive device for the handrail band disposed in a lower bed of the escalator, which drives the handrail band to move in cycle without breaking away from the handrail band rail.

The drive device for the handrail band comprises a driving wheel, a driven wheel, a handrail band drive wheel connected with the driven wheel coaxially, and a handrail band drive chain connected between the drive wheel and the driven wheel in circle. The driving wheel is driven to rotate by a motor, and the handrail band drive wheel, connected with the driven wheel coaxially, is rotated by the handrail band drive chain connected between the driving wheel and the driven wheel in circle. The handrail band extends through a gap between the handrail band drive wheel and a guiding roll for the handrail band, and is pressed against the handrail band drive wheel, so as to be driven to move in circle by a friction force between the handrail band and the handrail band drive wheel.

A problem exists in the drive device for the handrail band of the prior art is, the handrail band drive chain will loosen after running several months, and a pivot point of the handrail band drive wheel needs to be moved far away from the driving wheel to a new pivot point position so as to tension the handrail band drive chain. Furthermore, a pivot point of the guiding roll for the handrail band needs to be adjusted accordingly with the new pivot point position of the handrail band drive wheel, which brings a heavy work on site periodically, and hence a quality problem to the handrail system.

Therefore there exists a need to improve a handrail system in the prior art, especially a handrail band drive device, so as to eliminate or alleviate heavy work on site periodically for the handrail band drive device, and improve quality of the handrail system.

SUMMARY

An object of the present disclosure is to provide a tension device for a drive chain, which can eliminate or alleviate heavy work on site periodically for the handrail band drive device, and even can tension the drive chain of the escalator system automatically. Another object of the present is to provide an escalator system and a method using the tension device for the drive chain.

According to one aspect of the present disclosure, an escalator system is provided. The escalator system comprises a handrail band and a handrail band drive system, comprising a drive chain mounted and rotated around a driving wheel and a driven wheel, a tension device for the drive chain and a handrail band driving wheel coaxially connected to the driven wheel. The handrail band is pressed against the handrail band driving wheel and driven to circulate by a friction of the handrail band driving wheel, and the tension device comprises a pair of pressing blocks, each of which is provided on one of outer sides of portions of the drive chain between the driving wheel and the driven wheel respectively, and the pressing blocks apply pressures to the portions so as to move them close to each other.

Preferably, the escalator system further comprises handrail band guiding rollers with handrail band directed through a gap between the handrail band driving wheel and the handrail band guiding rollers.

Preferably, the tension device is secured on a bracket which is a truss system of the escalator system.

Preferably, the handrail band is supported on a guard rail of the truss system.

Preferably, the pressures are applied by a weight connected with the pressing blocks.

Preferably, the pressures are applied by a pre-loaded spring connected with the pressing blocks.

According to another aspect of the present disclosure, a tension device for a drive chain of an escalator is provided. The drive chain is mounted and rotated around a driving wheel and a driven wheel. The tension device for the drive chain of the escalator comprises a pair of pressing blocks, each of which is provided on one of outer sides of portions of the drive chain between the driving wheel and the driven wheel respectively. The pressing blocks apply pressures to the portions so as to move them close to each other.

Preferably, the pressures are applied by a weight connected to the pressing blocks.

Preferably, the pressures are applied by a pre-loaded spring connected with the pressing blocks.

Preferably, each of the pressing blocks is connected to a base plate by a connecting rod, with at least one of the connecting rod connected to the base plate via a hinge, and the base plate is secured on a bracket of the escalator.

Preferably, a cable wire fastener is provided on one connecting rod, a guiding and supporting member for the cable wire is provided on the other connecting rod. One end of the cable wire is fastened to the one connecting rod by the cable wire fastener, guided and supported by the guiding and supporting member for the cable wire on the other connecting rod, and the other end of the cable wire is connected to the weight. The weight applies pressures to the connecting rods through the cable wire fastener and the guiding and supporting member for the cable wire. At least one of the connecting rods rotate about the respective hinges close to each other, and the pressing blocks apply pressures to the drive chain to move the portions of the drive chain between the driving wheel and the driven wheel close to each other.

Preferably, a spring support rod fastener is provided on one connecting rod, by which one end of a spring support rod is secured to the one connecting rod. A guiding and supporting member for the spring support rod is provided on the other connecting rod, through which the other end of the spring support rod extends. A spring and a spring adjuster are supported on the guiding and supporting member, with the spring adjuster being disposed on outer side of the connecting rods and the spring being pre-pressed between the spring adjuster and the spring guiding and supporting member. The spring applies pressures to the connecting rods through the spring support rod fastener and the guiding and supporting member, to allow the connecting rods to rotate about respective hinges close to each other, and the pressing blocks to apply pressures to the drive chain to move the portions of the drive chain close to each other.

Preferably, a spring support rod fastener is provided on one connecting rod, by which one end of a spring support rod is secured to the one connecting rod. A guiding and supporting member for the spring support rod is provided on the other connecting rod, through which the other end of the spring support rod extends. A spring and a spring adjuster are supported on the guiding and supporting member, with the spring adjuster being disposed between the connecting rods and the spring being pre-tensioned between the spring adjuster and the guiding and supporting member. The spring applies pulling forces to the connecting rods through the spring support rod fastener and the guiding and supporting member, to allow the connecting rods to rotate about respective hinges close to each other, and the pressing blocks to apply pressures to drive chain to allow the drive chain portions move to close to each other.

Preferably, the connecting rods and the pressing blocks lie in a plane parallel with a plane defined by the driving wheel, the driven wheel and the drive chain.

Preferably, a contact surface of one of the pressing blocks contacting with the drive chain is a smooth surface, and a cross section of the pressing blocks in the plane is in shape of a half of an ellipse.

Preferably, the tension device further comprises a support assembly, which comprises a supporting plate secured to the bracket, and a pair of supporting blocks secured on the supporting plate on each of inner sides of the drive chain respectively so as to support the drive chain.

Preferably, the supporting blocks lie in the plane defined by the drive wheel, the driven wheel and the drive chain, a contact surface of one of the supporting blocks contacting with the drive chain is a smooth surface, and a cross section of the supporting blocks in the plane is in shape of a quarter of an ellipse.

Preferably, the cable wire fastener and the guiding and supporting member for the cable wire each is provided on the corresponding connecting rod at a position far away from a connecting point of the corresponding connecting rod connected to the base plate.

Preferably, the base plate comprises two pieces of plates, the hinges are secured to one of the two pieces of plates, and the other of the two pieces of the plates is secured to the bracket.

According to another aspect of the present disclosure, a method for tensioning a drive chain of an escalator is provided, comprising: providing the drive chain mounted and rotated around a drive wheel and a driven wheel, providing a pair of pressing blocks, each being on one of outer sides of portions of the drive chain between the driving wheel and the driven wheel, and applying a gravity of a weight or a pre-loaded force of a pre-loaded spring to the pressing blocks, to allow the pressing blocks apply a pressure to drive chain portions to make them close to each other.

The present disclosure can eliminate loosening of the drive chain after running several months without a need to move a pivot point of the drive band drive wheel far away from that of the driving wheel to tension the drive chain for the handrail band, and hence without a need to adjust handrail band guiding roll according to a new pivot point of the handrail band drive wheel, eliminate periodically heavy work on site for the escalator system and a drive system comprising the drive chain and improve quality thereof in a simple, reliable and low cost manner.

DETAILED DESCRIPTION

Various exemplary embodiments of the present disclosure will be described below with reference to the accompanying drawings. The present disclosure is not limited to the embodiments described. Directional terms mentioned in the description, such as: the inner side and the outer side, etc., are simply determined according to an orientation of a handrail system comprising a tension device for a drive chain, as shown in FIG. 1.

Figure 1:
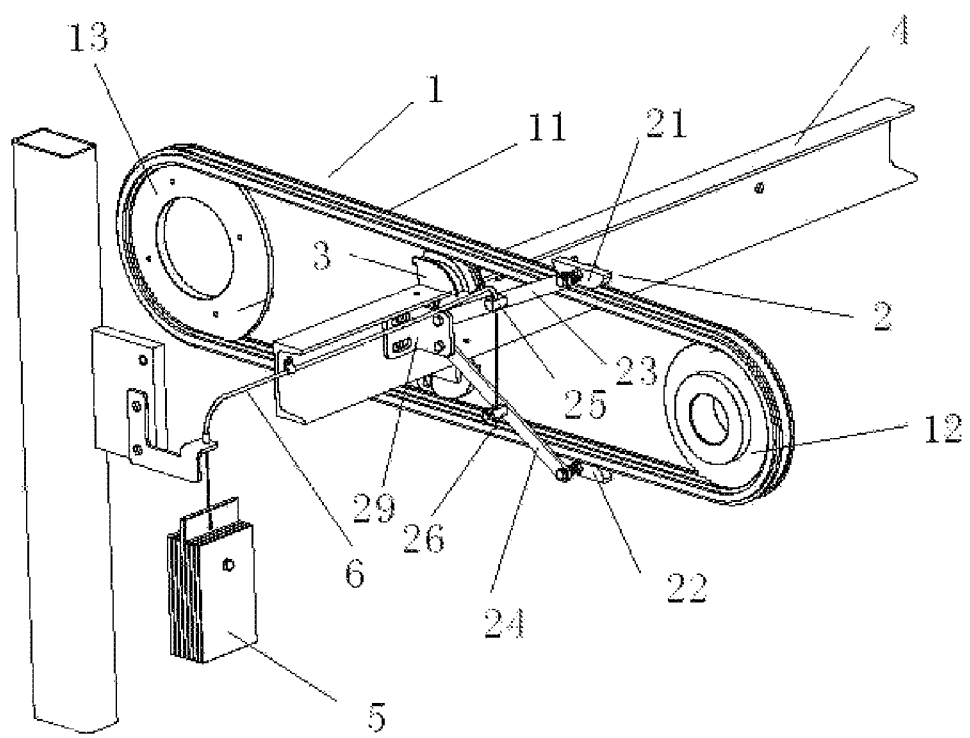
FIG. 1 is a perspective view of a handrail system comprising a tension device for a drive chain according to an embodiment of the present disclosure.

FIG. 1 is a perspective view of a handrail system comprising a tension device for the drive chain according to the present disclosure. The handrail system is generally referenced by reference number 1. The handrail system 1 comprises a driving wheel 13 driven by a motor (not shown), a driven wheel 12 rotating a handrail band drive wheel (not shown), and a drive chain 11 running in circle between the driving wheel 13 and the driven wheel 12. Generally, the drive chain 11 will loosen and extend in length after running several months. Commonly, in the prior art, in view that the motor driving the handrail band drive wheel is commonly used with a driving device for driving steps of the escalator, a center of the driven wheel 12 usually needs to be moved far away from that of the driving wheel 13 of the handrail system 1, so as to tension the loosened drive chain 11. However, since the handrail band drive wheel is generally mounted coaxially with the driven wheel 12, the center of the handrail band drive wheel needs to be moved far away from the center of the driving wheel 13 correspondingly. As a result, to maintain normally running of the system, a position of a guiding roll mating with the handrail band drive wheel to guide the handrail band needs to be adjusted correspondingly as well. Furthermore, such adjustments described above occur periodically, which brings a large amount work for maintenance and a problem on quality of the handrail system.

In FIG. 1, it is also shown a tension device for the drive chain according to the present disclosure referenced generally by a reference number 2. In FIG. 1, the tension device for the drive chain 2 is mounted to a bracket 4, which is a support truss of the escalator system. The tension device for the drive chain 2 is subjected a force applied by a weight 5 via a cable wire 6, and the tension device for the drive chain 2 in turn applies the force to either outer side of portions of the drive chain 11 between the driving wheel 13 and the driven wheel 12 to move the portions to be close to each other, so as to tension the drive chain 11 automatically without need of periodic adjustment by a person. Optionally, the tension device for the drive chain 2 can be made not to apply the force via the cable wire 6 with the weight 5, but to apply the force through a pulling bar, and the force needs to be adjusted periodically. Even in the case that the force needs to be adjusted periodically, comparing with the work for adjusting the center of the driven wheel far away from that of the driving wheel, the work for only periodically adjusting the force applied by the tension device for the drive chain 2 to the drive chain is reduced obviously.

In FIG. 1, it is also shown a support assembly according to the present disclosure, which is generally referenced by a reference number 3. The support assembly 3 supports inner sides of the drive chain 11 to apply support force to the driven chain 11, so that in case it is used together with the tension device for the drive chain 2, the support assembly 3 is used to prevent the drive chain 11 from contacting any other components during tensioning of the drive chain.

The support assembly 3 shown in FIG. 1 is fixed directly onto the bracket 4. In fact, if the support assembly 3 is fixed onto the bracket 4 via an assembly with a plurality of connecting rods, a same result of tensioning the drive chain 11 can also be obtained, but differences lie in that the support assembly 3 fixed onto the bracket 4 via the assembly with a plurality of connecting rods apply forces in opposite directions to make portions of the drive chain between the driving wheel 13 and the driven wheel 12 to move far away from each other, so as to tension the drive chain. Again, the support forces can be applied through corporation of the weight 5, the cable wire 6 and the assembly with a plurality of connecting rods fixed to the bracket, so as to tension the drive chain 11 automatically without periodic adjustments by a person. Again, it is not necessary for the support assembly 3 to be fixed onto the bracket 4 via the assembly with a plurality of connecting rods to comprise the weight 5. The force is applied only through the assembly with a plurality of connecting rods, which can be adjusted periodically by a person. Thus, even in the case that the force needs to be adjusted periodically, comparing with the work for adjusting the center of the driven wheel far away from that of the driving wheel, the work for only periodically adjusting the force applied by the tension device for the drive chain 2 to the drive chain is reduced obviously.

Figure 2:
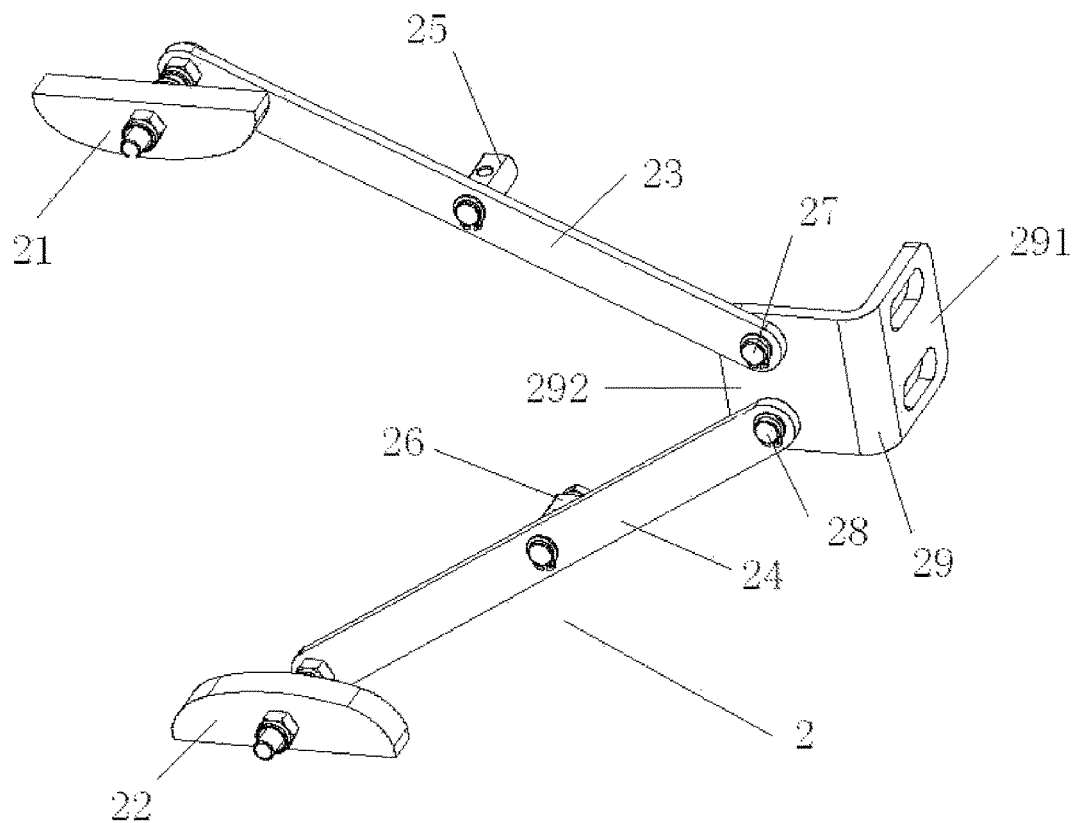
FIG. 2 is a front perspective view of the tension device for the drive chain according to the embodiment of the present disclosure.
Figure 3:
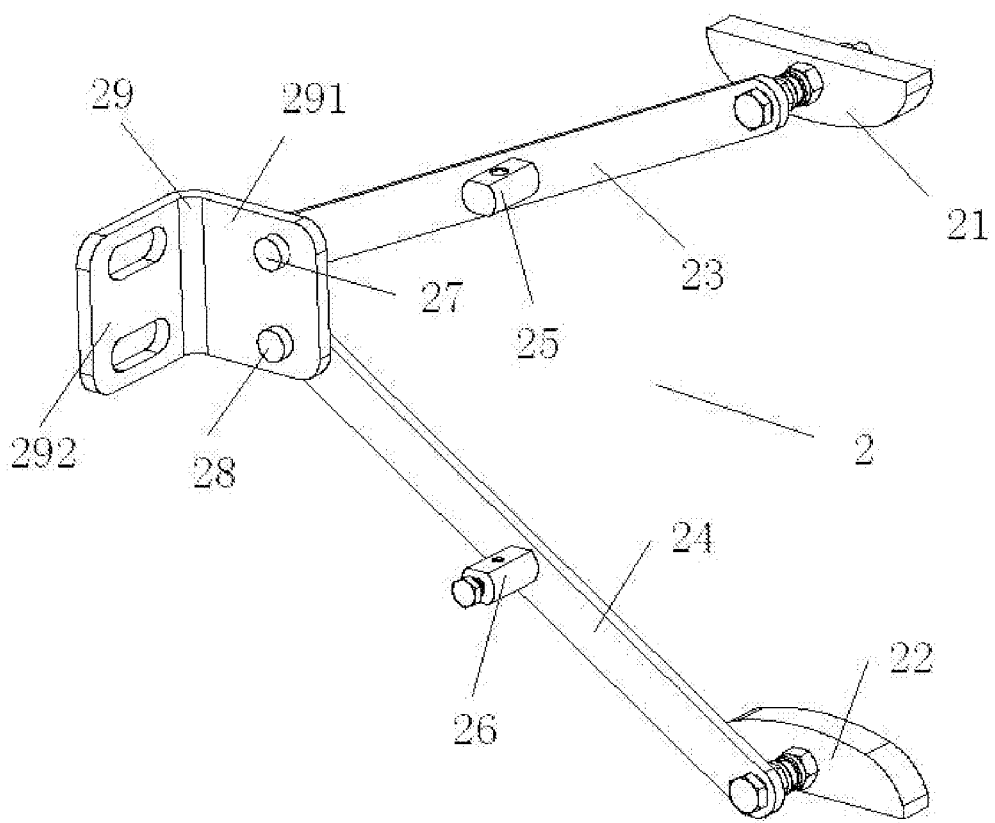
FIG. 3 is a back perspective view of the tension device for the drive chain according to the embodiment of the present disclosure.

FIG. 2 is a front perspective view of the tension device for the drive chain 2 according to an embodiment of the present disclosure, and FIG. 3 is a back perspective view of the tension device for the drive chain 2 of FIG. 2. From FIGS. 2 and 3, it can be seen that the tension device for the drive chain 2 comprises a base plate 29, a first hinge 27, a second hinge 28, a first connecting rod 23, a second connecting rod 24, a first pressing block 21, and a second pressing block 22. The base plate 29 comprises a first branch plate 291 and a second branch plate 292 with an angle of about 90 degrees. The second branch plate 292 is fixed to the bracket 4, and the first hinge 27 and the second hinge 28 are fixed to the first branch plate 291. One end of the first connecting rod 23 is connected with the first hinge 27, and the other end of the first connecting rod 23 is connected with and supports the first pressing block 21. One end of the second connecting rod 24 is connected with the second hinge 28, and the other end of the second connecting rod 24 is connected with and supports the second pressing block 22. A cable wire fastener 26 is secured to the second connecting rod 24 at a position far away from the second hinge 28e of the second connecting rod 24. A guiding and supporting member for the cable wire 25 is fixed to the first connecting rod 23 at a position far away from the first hinge 27 of the connecting rod 23. One end of the cable wire 6 in FIG. 1 can be fixed to the cable wire fastener 26, and the other end of the cable wire 6 is guided and supported by the supporting and guiding member 25 for the cable wire 6 and is connected with the weight 5. Thus the weight 5 can apply its gravity via the cable wire to the cable wire fastener 26 and the supporting and guiding member for the cable wire 6, and then apply forces to the first connecting rod 23 and the second connecting rod 24 to rotate the first connecting rod 23 and the second connecting rod 24 with respect to the first hinge 27 and the second hinge 28 respectively to be close to each other. The forces are applied via the first pressing block 21 and the second pressing block 22 on outer sides of the portions of the drive chain 11 between the driving wheel 13 and the driven wheel 12, to move the portions to be close to each other so as to tension the drive chain 11. In this embodiment, the tension device for the drive chain 2 is subjected to the forces applied by the weight 5 via the cable wire 6, and it in turn applies the forces to the outer sides of the portions of the drive chain 11 between the driving wheel 13 and the driven wheel 12 to move the portions to be close to each other, so as to tension the drive chain 11 automatically without periodic adjustments by a person.

In an embodiment according to the present disclosure, a first connecting rod 23 and a second connecting rod 24 do not apply forces through the cable wire with a weight, but apply forces only through a pulling bar at a position of the first connecting rod 23 and the second connecting rod 24 far away from a first hinge 27 and a second hinge 28 to rotate the first connecting rod 23 and the second connecting rod 24 with respect to the first hinge 27 and the second hinge 28 respectively to move closely to each other. Then the first connecting rod 23 and the second connecting rod 24 in turn apply forces to the drive chain 11 at outer sides of the portions of the drive chain 11 between the driving wheel 13 and the driven wheel 12 through a first pressing block 21 and a second pressing block 22 connected therewith respectively, so as to tension the handrail band drive chain 11. Comparing with the embodiments shown in FIGS. 2 and 3, differences lie in that the forces applied by the pulling bar to the first connecting rod 23 and the second connecting rod 24 can be adjusted periodically by a person. As a result, although the embodiment, adjustments to the forces applied by the pulling bar are needed periodically by a person, comparing with the work for adjusting the center of the driven wheel far away from that of the driving wheel, the work for only periodically adjusting the force applied by the tension device for the drive chain 2 to the drive chain is reduced obviously.

Turn back to FIG. 1. From FIG. 1 it can be seen that the first connecting rod 23, the second connecting rod 24, the first pressing block 21 and the second pressing block 22 lie in a plane in parallel with a plane defined by the driving wheel 13, the driven wheel 12 and the drive chain 11. To reduce abrasion to the drive chain 11 caused by the pressing blocks, surfaces of the first block 21 and the second block 22, which contact with the drive chain 11, are smooth surfaces, with a cross section of shape of a half ellipse taken along the plane defined by the driving wheel 13, the driven wheel 12 and the drive chain 11. The shape of the cross section can also be, for example, a half oblong, a half oval, an ellipse, an oblong and an oval etc.

Figure 4:
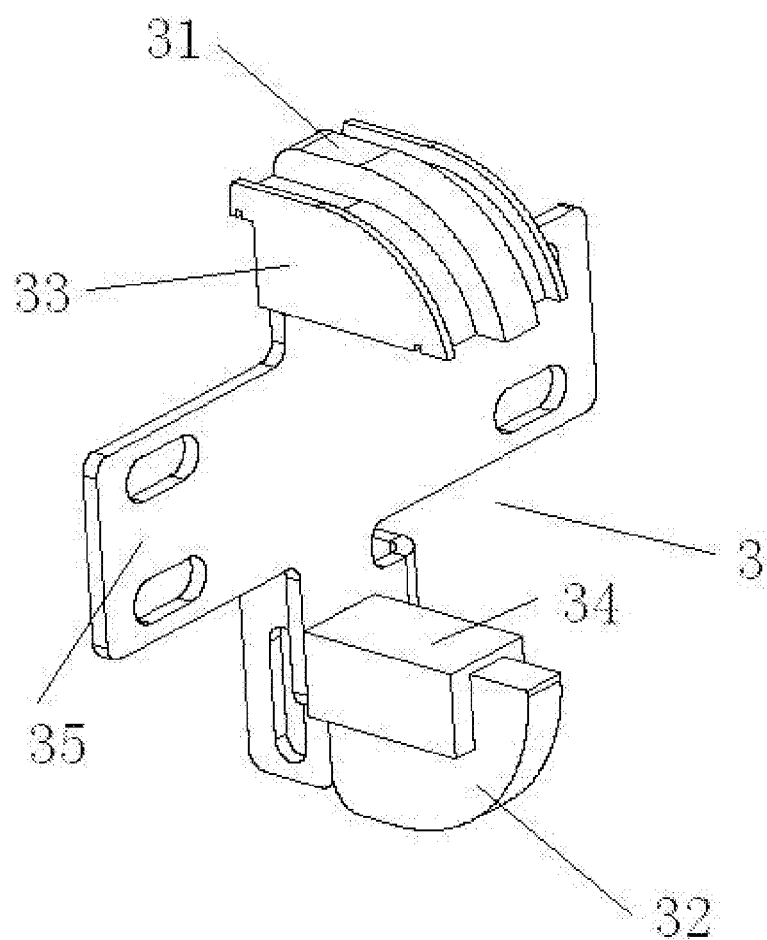
FIG. 4 is a perspective view of the support assembly according to the present disclosure.
Figure 5:
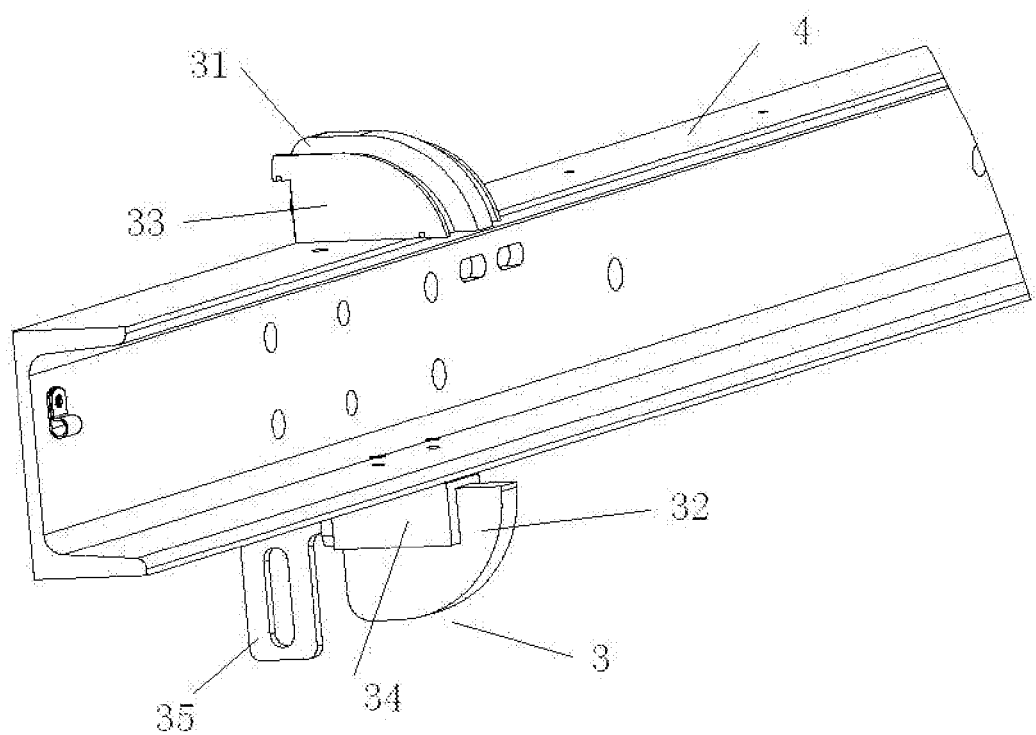
FIG. 5 is a perspective view of the support assembly according to the present disclosure, which is mounted on a bracket.

FIG. 4 is a perspective view of the support assembly according to the present disclosure and FIG. 5 is a perspective view of the support assembly according to the present disclosure mounted on the bracket. From FIGS. 4 and 5 it can be seen, the support assembly 3 comprises a supporting plate 35, a first supporting block 31 and a second supporting block 32, with the supporting plate 35 fixed on the bracket 4, and the first supporting block 31 and the second supporting block 32 fixed on the supporting plate 35. When the supporting plate 35 is fixed on the bracket 4, as shown in FIG. 5, the first supporting block 31 and the second supporting block 32 are on the inner sides of the drive chain 11, and then supporting forces are applied in opposite directions to the drive chain 11 to move portions of the drive chain between the driving wheel 13 and the driven wheel 12 (shown in FIG. 1) far away from each other. The first supporting block 31 and the second supporting block 32 can be fixed directly on the supporting plate 3. The first supporting block 31 and the second supporting block 32 can also be held through a first snap joint 33 and a second snap joint 34 fixed on the supporting plate 3, as shown in FIGS. 4 and 5. The first snap joint 33 and the second snap joint 34 each has a snapping groove, and each of the first supporting block 31 and the second supporting block 32 can be held by mating with one of the snapping groove. The first supporting block 31 and the second supporting block 32 also lie in the plane defined by the driving wheel 13, the driven wheel 12 and the drive chain 11. Again, to reduce abrasion to the drive chain 11 when contacting with it, surfaces of the first block 21 and the second block 22, which contact with the drive chain 11, are smooth surfaces, with a cross section of shape of a quarter of an ellipse taken along the plane. The shape of the cross section can also be, for example, a quarter of an oblong, a quarter of an oval shape, a quarter of an ellipse, a quarter of an oblong and a quarter of an oval shape etc.

A function of the support assembly 3 is to be used to cooperate with the tension device for the drive chain, so as to avoid the portions of the drive chain 11 between the driving wheel 13 and the driven wheel 12 to move inward so much by action of the tension device for the drive chain 2 that they contact with other components.

Figure 6:
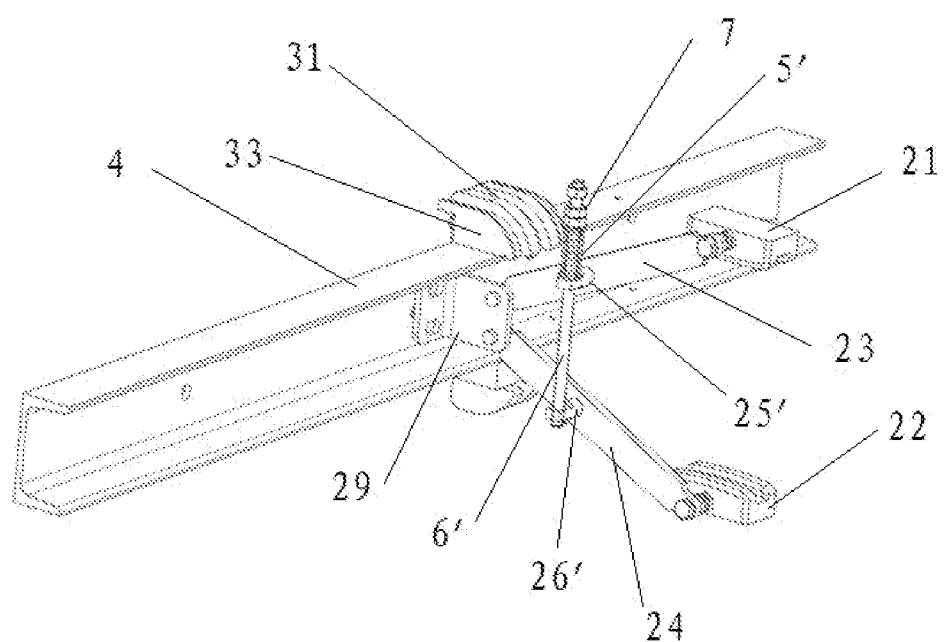
FIG. 6 is a perspective view of a tension device for a drive chain according to another embodiment of the present disclosure.

FIG. 6 is a perspective view of a tension device for a drive chain according to another embodiment of the present disclosure. This embodiment is similar to those shown in FIGS. 1-3, and same components are referenced by same reference numbers as those in FIGS. 1-3. Differences lie in that the weight and the cable wire are replaced by a pre-loaded spring 5' provided on a spring support rod 6' with a spring adjuster 7.

Specifically, in FIG. 6, a spring support rod fastener 26' is provided on one connecting rod 24. One end of the spring support rod 6' is secured to the one connecting rod 24. A spring support rod guiding and supporting member 25' is provided on the other connecting rod 25. The other end of the spring support rod extends through the spring support rod guiding and supporting member 25'. The pre-loaded spring 5' and the spring adjuster 7 are supported on the spring support rod, with the spring adjuster 7 being disposed on an outer side of the connecting rods. The spring 5' is pre-pressed between the spring adjuster 7 and the spring support rod guiding and supporting member 25', so that the spring 5' applies pressures to the connecting rods 23, 24 through the spring support rod fastener 26' and the spring support rod guiding and supporting member 25', causing the connecting rods 23, 24 to rotate about respective hinges to be close to each other. Then pressing blocks 21 and 23 in turn apply pressures to the portions of drive chain between the driving wheel 13 and a driven wheel 12 so that the portions of the drive chain between the driving wheel and the driven wheel move to be close to each other to tension the drive chain automatically, if the drive chain loosens after running several months.

The pre-loaded spring 5' and the spring adjuster 7 can be embodied to be disposed on inner sides of the connecting rods as well, which does not departure from the protection scope of the present disclosure. As a result, the spring 5' is pre-tensioned between the spring adjuster 7 and the spring support rod guiding and supporting member 25', so that the spring 5' applies pulling forces to the connecting rods 23, 24 through the spring support rod fastener 26' and the spring support rod guiding and supporting member 25', causing the connecting rods 24, 25 to rotate about respective hinges to be close to each other. Then pressing blocks 21 and 23 in turn apply pressures to the portions of the drive chain between the driving wheel 13 and a driven wheel 12 so that portions of the drive chain between the driving wheel 13 and the driven wheel 12 move to be close to each other to tension the drive chain automatically, if the drive chain loosens after running several months.

It should be noted that said embodiments are just illustrative, and should not be considered to limit the present disclosure. Some technical features in the embodiments may be combined to obtain more embodiments of the present disclosure, scope of which is only defined by attached claims. A plurality of variants and modifications can be made without departing from the scope of the present disclosure.

What is claimed is:

1. An escalator system, comprising
   a handrail band; and
   a handrail band drive system, comprising a drive chain mounted and rotated around a driving wheel and a driven wheel, a tension device for the drive chain and a handrail band driving wheel coaxially connected to the driven wheel,
   wherein the handrail band is pressed against the handrail band driving wheel and driven to circulate by a friction of the handrail band driving wheel, and
   wherein the tension device comprises a pair of pressing blocks, each of which is provided on one of outer sides of portions of the drive chain between the driving wheel and the driven wheel respectively, and the pressing blocks apply pressures to the portions so as to move them close to each other, and
   wherein the tension device further comprises a support assembly, secured on each of inner sides of the drive chain respectively on a bracket of the escalator so as to support the drive chain.

2. The escalator system according to claim 1, further comprising handrail band guiding rollers with the handrail band directed through a gap between the handrail band driving wheel and the handrail band guiding rollers.

3. The escalator system according to claim 1, wherein the tension device is secured on the bracket, the bracket is a truss system of the escalator system.

4. The escalator system according to claim 3, wherein the handrail band is supported on a guard rail of the truss system.

5. The escalator system according to claim 1, wherein the pressures are applied by a weight connected to the pressing blocks.

6. The escalator system according to claim 1, wherein the pressures are applied by a pre-loaded spring connected with the pressing blocks.

7. A tension device for a drive chain of an escalator, wherein the drive chain is mounted and rotated around a driving wheel and a driven wheel, comprising:
   a pair of pressing blocks, each of which is provided on one of outer sides of portions of the drive chain between the driving wheel and the driven wheel respectively,
   wherein the pressing blocks apply pressures to the portions so as to move them close to each other, and wherein the tension device further comprises a support assembly secured on each of inner sides of the drive chain respectively on a bracket of the escalator so as to support the drive chain.

8. The tension device according to claim 7, wherein the pressures are applied by a weight connected to the pressing blocks.

9. The tension device according to claim 7, wherein the pressures are applied by a pre-loaded spring connected with the pressing blocks.

10. The tension device according to claim 8, wherein each of the pressing blocks is connected to a base plate by a connecting rod, with at least one of the connecting rods connected to the base plate via a hinge, and the base plate secured on a bracket of the escalator.

11. The tension device according to claim 8, wherein
a cable wire fastener is provided on one a first connecting rod among the connecting rods,
a guiding and supporting member for a cable wire is provided on a second connecting rod among the connecting rods,
a first end of the cable wire is fastened to the first connecting rod by the cable wire fastener, guided and supported by the guiding and supporting member for the cable wire on the second connecting rod, and
a second end of the cable wire is connected to the weight, and
wherein the weight applies pressures to the connecting rods through the cable wire fastener and the guiding and supporting member for the cable wire, at least one of the connecting rods rotate about respective hinges close to each other, and the pressing blocks apply pressures to the drive chain to move the portions of the drive chain between the driving wheel and the driven wheel close to each other.

12. The tension device of claim 9, wherein
a spring support rod fastener is provided on a first connecting rod among the connecting rods, by which a first end of a spring support rod is secured to the first connecting rod,
a guiding and supporting member for the spring support rod is provided on a second connecting rod among the connecting rods, through which a second end of the spring support rod extends, and
a spring and a spring adjuster are supported on the guiding and supporting member, with the spring adjuster being disposed on outer side of the connecting rods and the spring being pre-pressed between the spring adjuster and the spring guiding and supporting member, and
wherein the spring applies pressures to the connecting rods through the spring support rod fastener and the guiding and supporting member, to allow the connecting rods to rotate about respective hinges close to each other, and the pressing blocks to apply pressures to the portions of the drive chain to move them chain close to each other.

13. The tension device of claim 9, wherein
a spring support rod fastener is provided on a first connecting rod among the connecting rods, by which a spring support rod is secured to the first connecting rod at a first end,
a guiding and supporting member for the spring support rod is provided on a second connecting rod among the connecting rods, through which a second end of the spring support rod extends,
a spring and a spring adjuster are supported on the guiding and supporting member, with the spring adjuster being disposed between the connecting rods and the spring being pre-tensioned between the spring adjuster and the guiding and supporting member, and
the spring applies a pulling force to the connecting rods through the spring support rod fastener and the guiding and supporting member, to allow the connecting rods to rotate about respective hinges close to each other, and the pressing blocks to apply pressures to the portions of the drive chain to move them close to each other.

14. The tension device according to claim 10, wherein the connecting rods and pressing blocks lie in a plane parallel with a plane defined by the driving wheel, the driven wheel and the drive chain.

15. The tension device according to claim 14, wherein a contact surface of one of the pressing blocks contacting with the drive chain is a smooth surface, and a cross section of the pressing blocks in the plane is in shape of a half of an ellipse.

16. The tension device according to claim 15, wherein the support assembly comprises a supporting plate secured to the bracket, and a pair of supporting blocks secured on the supporting plate on each of inner sides of the drive chain respectively so as to support the drive chain.

17. The tension device according to claim 16, wherein the supporting blocks lie in the plane defined by the drive wheel, the driven wheel and the drive chain, a contact surface of one of the supporting blocks contacting with the drive chain is a smooth surface, and a cross section of the supporting blocks in the plane is in shape of a quarter of an ellipse.

18. The tension device according to claim 11, wherein the cable wire fastener and the cable guiding and supporting member for the cable wire each is provided on corresponding connecting rod at a position far away from a connecting point of one of the connecting rod to the base plate.

19. The tension device according to claim 10, wherein the base plate comprises two pieces of plates, the hinges are secured to one of the two pieces of plates, and the other of the two pieces of the plates is secured to the bracket.

20. A method for tensioning a drive chain of an escalator, comprising:
providing the drive chain mounted and rotated around a drive wheel and a driven wheel,
providing a pair of pressing blocks, each being on one of outer sides of portions of the drive chain between the driving wheel and the driven wheel,
providing a support assembly secured on each of inner sides of the drive chain respectively on a bracket of the escalator so as to support the drive chain, and
applying a gravity of a weight or a pre-loaded force of a pre-loaded spring to the pressing blocks, to allow the pressing blocks to apply pressures to the portions of the drive chain to move them close to each other.

* * * * *